(12) United States Patent
Uehira et al.

(10) Patent No.: US 7,922,146 B2
(45) Date of Patent: Apr. 12, 2011

(54) OPTICAL ELEMENT FORMING METAL MOLD AND METHOD OF MANUFACTURING OPTICAL ELEMENT FORMING METAL MOLD

(75) Inventors: Masayoshi Uehira, Osaka (JP); Yuzo Nakatsuka, Tachikawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 395 days.

(21) Appl. No.: 12/055,499

(22) Filed: Mar. 26, 2008

(65) Prior Publication Data
US 2008/0245475 A1   Oct. 9, 2008

(30) Foreign Application Priority Data
Mar. 29, 2007   (JP) .................................. 2007-087513

(51) Int. Cl.
B29D 11/00   (2006.01)

(52) U.S. Cl. ...................... 249/135; 249/114.1; 249/115; 249/116; 425/808; 65/26; 65/374.11; 65/374.12; 65/374.13; 427/133

(58) Field of Classification Search ........ 249/114.1–116, 249/134, 135; 425/808; 65/26, 305, 374.1, 65/374.11–374.13; 106/38.2, 38.22, 38.9; 427/133–135
See application file for complete search history.

(56) References Cited

U.S. PATENT DOCUMENTS

| | | | |
|---|---|---|---|
| 5,176,839 A * | 1/1993 | Kim ................................ | 249/78 |
| 5,458,818 A * | 10/1995 | Kim et al. .................... | 264/1.33 |
| 6,986,857 B2 * | 1/2006 | Klemm et al. ................ | 264/219 |
| 2003/0159467 A1 * | 8/2003 | Hirota et al. ..................... | 65/26 |
| 2005/0285287 A1 * | 12/2005 | Okumura et al. .............. | 264/2.5 |
| 2007/0040291 A1 * | 2/2007 | Naito ............................. | 264/2.5 |
| 2009/0278270 A1 * | 11/2009 | Nakatsuka et al. ............ | 264/2.5 |

FOREIGN PATENT DOCUMENTS

| | | | | |
|---|---|---|---|---|
| JP | 01111742 A | * | 4/1989 | |
| JP | 05132752 | * | 5/1993 | |
| JP | 09234838 A | * | 9/1997 | |
| JP | 11231154 | * | 8/1999 | |
| JP | 2002-096335 | | 4/2002 | |
| JP | 2002096335 A | * | 4/2002 | |
| JP | 2004-175112 A | * | 6/2004 | |
| JP | 2004175112 A | * | 6/2004 | |

OTHER PUBLICATIONS

Translation of JP 2002-96335.*
Abstract of JP 2002-096335 (Minolta Co Ltd).

* cited by examiner

Primary Examiner — Joseph S Del Sole
Assistant Examiner — Dimple Bodawala
(74) Attorney, Agent, or Firm — Finnegan, Henderson, Farabow, Garrett & Dunner, L.L.P.

(57) ABSTRACT

A method of forming an optical element forming metal mold to form an optical element, having steps of: laminating a heat insulation layer 13 on a surface of the base member 11 where the optical element is formed; laminating an intermediate metal layer 14 on a surface of the heat insulation layer 13 by thermal spraying; laminating a surface forming layer 15, on which a surface shape to be transferred to the optical element is formed, on the intermediate metal layer 14; wherein the intermediate metal layer 14 is laminated in a way that parts of the heat insulation layer 13 are exposed substantially evenly from the intermediate layer 14.

3 Claims, 5 Drawing Sheets

FIG. 2

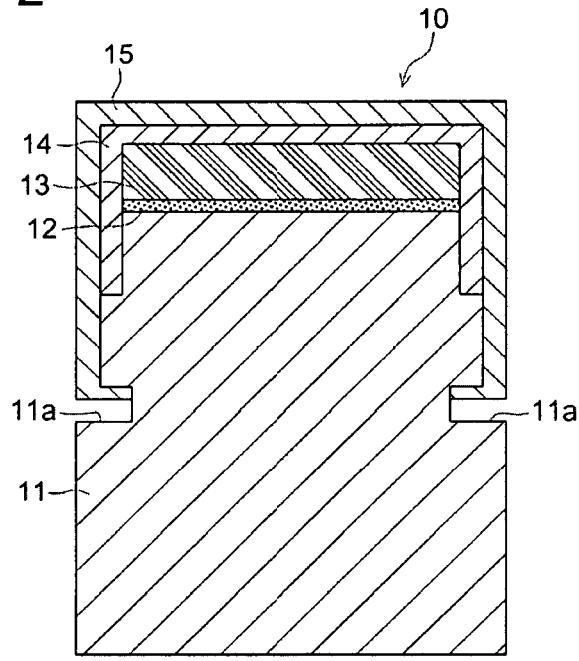

FIG. 3

| LAYER | MATERIAL | THERMAL CONDUCTIVITY (W/mk) | LINER EXPANSION COEFFICIENT ($10^{-6}$/°C) | THICKNESS | PRODUCTION METHOD |
|---|---|---|---|---|---|
| SURFACE TREATMENT LAYER | Ni-P | 4.0-7.2 | 11-12 | 100 μm | ELECTROLESS NICKEL PLATING |
| INTERMEDIATE LAYER | NiAl | >20 | 13 | 0.02 mm | HVOF THERMAL SPRAYING |
| HEAT INSULATION LAYER | Zr-Mg OXIDE | 1-1.5 | 10-11 | 0.9 mm | PLASMA THERMAL SPRAYING |
| BONDING LAYER | NiCr | 20 | 15 | 0.1 mm | PLAZMA THERMAL SPRAYING |
| BASE MATERIAL | STAINLESS STEEL | 23 | 11 | - | - |

FIG. 5

| | QUANTITY OF POWDER | TIME OF THERMAL SPRAYING | EXPOSURE OF HEAT INSULATION LAYER | EVALUATION OF EACH LAYER |
|---|---|---|---|---|
| PRESENT EMBODIMENT 1 | 6 g/min | 0.1 sec | EXPOSURE OF 0.0001 TO 0.01 mm² PER 0.1mm² OCCUPIES 80% OF WHOLE SURFACE | THE ADHESIVENESS BETWEEN SURFACE TREATMENT LAYER AND HEAT INSULATION LAYER IS SATISFACTORY WITHOUT SEPARATION BEING OCCURRED |
| COMPARATIVE EXAMPLE 1 | 12 g/min | 1 sec | NON | SEPARATION OF THE INTERMEDIATE METAL LAYER OCCURS PARTIALLY |
| COMPARATIVE EXAMPLE 2 | 2.5 g/min | 0.8 sec | A PROPORTION OF THE HEAT INSULATION LAYER EXPOSING FROM THE INTERMEDIATE METAL LAYER IN RESPECT TO THE WHOLE AREA OF HEAT INSULATION LAYER IS 50% AND EXPOSING IS UNEVEN | THE HEAT INSULATION LAYER DOES NOT EXPOSE EVENLY AND THE SURFACE TREATMENT LAYER AND HEAT INSULATION LAYER DO NOT ADHERE THUS THE SURFACE TREATMENT LAYER CANNOT BE FORMED AT THE PORTION THEREOF |

OPTICAL ELEMENT FORMING METAL MOLD AND METHOD OF MANUFACTURING OPTICAL ELEMENT FORMING METAL MOLD

This application is based on Japanese Patent Application No. 2007-087513 filed on Mar. 29, 2007, in Japanese Patent Office, the entire content of which is hereby incorporated by reference.

BACKGROUND OF THE INVENTION

The present inventions relates to an optical element forming metal mold to manufacture an optical element requires a sub-micron accuracy by injection mold of resin and a manufacturing method of the optical element forming metal mold.

For injection molding of resin A, a metal mold using metallic material such as a steel has been used. In rent years, a high degree of sub-micron accuracy has been required for the optical elements due to miniaturization and precision optical element.

To form a precision optical element, there is suggested an optical element forming metal mold (for example, Unexamined Japanese Patent Application Publication No. 2002-96335) having a heat insulation layer and a surface forming layer laminated on a surface of a core stainless steel mold, where on a surface of a core mold, representing a metal mold to form one surface of the optical element, a ceramic series material is sprayed by thermal spraying to laminate a heat insulation layer on the metal mold base member, then a surface forming layer is formed on the heat insulation layer thereof by electroless deposition of a nonferrous material. Here, thermal spraying is a laminating method where a material in a shape of powder is melt in a high temperature, a melt material is sprayed onto a subject to be laminated, and the material is cooled and set so as to laminate layers on the subject.

However, in such an optical element forming metal mold, by repeating temperature rise and fall for forming the optical elements, there is a possibility of layer amotion. In particular, between the heat insulation layer of a ceramic series material and the surface forming layer of a nonferrous metal material amotion tends to occur due to a difference of thermal expansion coefficients. There is a possibility that local amotion causes an imperceptible distortion and a miss alignment of the surface forming layer, and deteriorates an accuracy of shape of the product.

Therefore, there has been suggested an optical element forming metal mold where an intermediated layer made of a material having an affinity for both the surface forming layer and the heat insulation layer is formed on the whole area of the heat insulation layer by thermal spraying.

However, since the material of the intermediate layer is selected by taking account of the affinity of both the heat insulation layer and the surface forming layer, it cannot be the best in the affinity of both the heat insulation layer and the intermediate layer. Therefore, as a conventional optical element forming metal mold, in case the intermediated layer is laminated on the whole area of the heat insulation layer by thermal spraying, when the material of the intermediate layer is cooled down and sets, the stress amotion occurs between the heat insulation layer and the intermediated layer thus a desired adhesiveness may not be obtained.

If the amotion occurs as above, optical performance of the optical element is deteriorated by distortion of the optical element which is formed by the deformed surface forming layer where a gap created by amotion is collapsed by a large pressure applied to form the optical element. Further, since the deformation of the amotion portion caused by the pressure often returns to an original shape while the pressure is not applied, a method to carry out precision machining after the deformation is actively created by design, cannot be utilized.

SUMMARY OF THE INVENTION

The present invention is achieved considering the above circumstances. An object of the present invention is to provide an optical element forming metal mold where amotion of the intermediate metal layer due to stress does not occur when the intermediate layer is formed on the heat insulation layer by thermal spraying, and a method of manufacturing the mold thereof.

The above object is achieved by the following embodiments. A first embodiment of a method of forming an optical element forming metal mold to form an optical element, having: laminating a heat insulation layer on an optical element forming side surface of a base member; laminating an intermediate metal layer on a surface of the heat insulation layer through thermal spraying; and laminating a surface forming layer, on which a surface having a surface shape to be transferred to the optical element is formed, on the intermediate metal layer; wherein the intermediate metal layer is laminated in a way that portions of the heat insulation layer are exposed substantially evenly from the intermediate layer.

A second embodiment of a method of forming an optical element forming metal mold to form an optical element, having: laminating a heat insulation layer on an optical element forming side surface of a base member; laminating an intermediate metal layer on a surface of the heat insulation layer through thermal spraying; and laminating a surface forming layer, on which a surface having a surface shape to be transferred to the optical element is formed, on the intermediate metal layer; wherein the intermediate metal layer is laminated in a way that portions of the heat insulation layer are exposed from the intermediate layer in a range that an area ration of the portions of the heat insulation layer being exposed form the intermediate metal layer in respect to a total area of a surface of the heat insulation layer is 0.5 to 40%.

A third embodiment of an optical element forming metal mold to form an optical element, having: a core mold; and a cavity mold arranged with a forming space between the core mold; wherein at least one of the core mold or the cavity mold comprises: a base member, a heat insulation layer formed on a surface of the base member, an intermediated metal layer formed through thermal spaying on an opposite side surface of the heat insulation layer to the base member, and a surface forming layer where a surface shape to be transferred onto the optical element is formed on a surface opposite to the heat insulation layer side of the intermediate metal layer, and the intermediate metal layer is formed in a way that portions of the heat insulation layer are exposed evenly.

A fourth embodiment of an optical element forming metal mold, comprising: a core mold; and a cavity mold arranged with a forming space between the core mold; wherein at least one of the core mold or the cavity mold comprises a base member, a heat insulation layer formed on a surface of the base member, an intermediated metal layer formed through thermal spaying on an opposite side surface of the heat insulation layer opposite to the base member, and a surface forming layer where a surface shape to be transferred onto the optical element is formed on a surface opposite to the heat insulation layer side of the intermediate metal layer, and the intermediate metal layer is laminated in a way that portions of the heat insulation layer is exposed from the intermediate layer in a range that an area ration of the portions of the heat insulation layer being exposed form the intermediate metal layer in respect to a total area of a surface of the heat insulation layer is 0.5 to 40%.

BRIEF DESCRIPTION OF THE DRAWINGS

FIG. 2 is a cross-sectional view to describe details of each layer of a metal mold for forming an optical element related to the present invention.

FIG. 3 is an explanatory table showing configurations of each layer.

FIG. 5 is a table describing conditions of thermal spaying, evaluations of exposure and evaluation of each layer of a metal mold to form an optical element under the conditions thereof.

DETAILED DESCRIPTION OF THE PREFERRED EMBODIMENT

A First Embodiment

Figure 1:
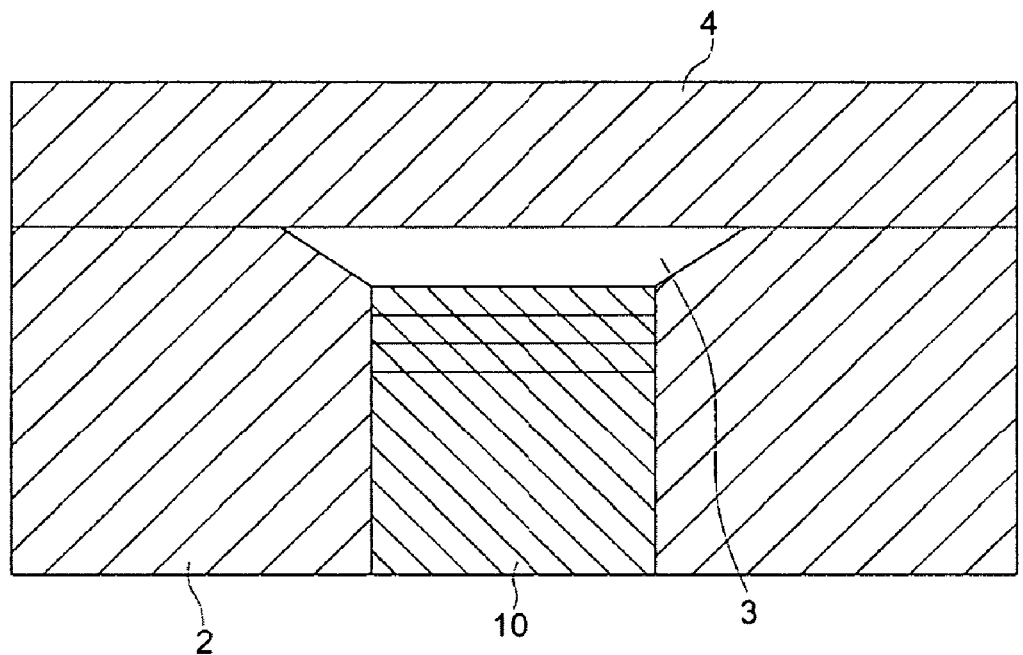
FIG. 1 is a cross-sectional view schematically showing an overall metal mold to form optical element related to the present invention.

The following will describes a method of manufacturing a metal mold for forming an optical element related to a first embodiment of the present invention. FIG. 1 is a cross-sectional view schematically showing an overall metal mold to form the optical element related to the present invention. FIG. 2 is a cross-sectional view to describe details of each layer of the metal mold for forming the optical element. Thermal spraying to be described is a lamination method where a material in shape of powder is melt in a high temperature then the melt material is sprayed onto the subject to be laminated, then the material is cooled and set, and as a result a laminate is formed on the subject.

As FIG. 1 shows, the metal mold for forming the optical element related to the present embodiment is configured with a metal mold 10 of a core mold and metal molds 2 and 4 of cavity molds. The metal molds 2 and 4 representing the cavity molds are the metal molds to form an optical element forming space representing a space to form the optical element surround a periphery of the metal mold 10 to form the optical element. A synthetic resin is injected into the optical element forming space 3 formed between the surface forming layer 15, which is formed on a surface at optical element forming space 3 side of the metal mold 10 of the core mold, and the metal molds 2 and 4 of the cavity molds so as to form a diffraction optical element representing an optical part made of a synthetic resin.

FIG. 2 is an enlarged view of the metal mold 10 in FIG. 1 (hereinafter this metal mold 10 is referred as "optical element forming mold"). This is an example of a metal mold to form a diffraction optical element. Now, in the present invention, while a bonding layer 12 is laminated between the base member 11 and the heat insulation layer 13 in order to improve adhesiveness, the bonding layer is not necessary if a high adhesiveness is not required.

FIG. 3 is a table of material of each layer and production methods. In FIG. 3, while the materials and the production methods are stipulated in an order according to allocation of each layer of the optical element forming metal mold in FIG. 2, in the following description, the table in FIG. 3 will be explained beginning at a bottom column in accordance with a procedure.

First, the base member 11 is made of a stainless steel commonly-used for metal molds, As the base member 11, a material having a thermal conductivity of 23 W/mk and a liner expansion coefficient of $11 \times 10^{-6}/°$ C. is used. The bonding layer 12 is formed with a thickness of 0.1 mm through plasma thermal spraying of NiCr onto the base member 11. As the bonding layer 12, a material having a thermal conductivity of 20 W/mk and a liner expansion coefficient of $15 \times 10^{-6}/°$ C. is used. The shape of the optical element to be formed is roughly formed by this base member.

The heat insulation layer 13 is preferred to be a material having a low thermal conductivity and a liner expansion coefficient which approximately equates to that of the base member. As the heat insulation layer 13, zirconium oxide series aluminum [aluminium] hydroxide series, titanium dioxide series and chrome oxide can be used. In the present embodiment, the heat insulation layer is formed with ZrO2.24MgO. This material is superior in density with a low porosity of the thermal spray layer and has a linier expansion coefficient which approximately equates to that of the base member 11 and a characteristic of thermal sock resistance. As the heat insulation layer 13, a material having the thermal conductivity of 1 to 1.5 W/mk and a linier expansion coefficient of 10 to $11 \times 10^{-6}/°$ C. is used. Also, since this material has a high melting temperature, the heat insulation layer can be formed with a thickness of approximately 0.9 mm through a plasma thermal spraying to be capable of creating a high temperature plasma state. Further, the heat insulation layer after thermal spraying is machined to be finished in a shape of a product.

Then, ceramic series materials are used for the heat insulation layer 13 so as to prevent the resin material from sudden cooling down since the heat of the resin material is conducted to the based material 11 at injection molding of the optical element. The heat insulation layer 13 is machined to be finished in the objective shape so that a variation of the thickness of the heat insulation layer 13 is eliminated. Thereby sharp edges are created to a periphery without dulling, and a form transferability of the periphery is improved. Also an adjacent intermediate metal layer next to the layer thereof can be made thin.

NiAl is used to the intermediate metal layer 14. This material has a thermal conductivity of 20 W/mk or more and a linier expansion coefficient of $13 \times 10^{-6}/°$ C. Now, high-velocity flame spraying (HVOF) to spray in a high speed is utilized. In this case, as a spraying condition, it is preferred that an amount of powder to be sprayed is 3 to 10 g/min. and spraying time is 0.01 to 1 sec. By this method, the heat insulation layer 13 is laminated so that a surface ratio of a portion where the heat insulation layer is exposing from the intermediated layer after thermal spraying becomes 0.5 to 40%. Further, in this spraying, it is preferred that a portion, where an area of the heat insulation layer 13 exposing from the intermediate metal layer 14 is 0.0001 to 0.01 mm² per 1 mm², becomes more than 10% in respect to the total area of whole surface of the intermediate metal layer, and in a remaining portion of a surface area of the intermediate metal layer 14, the intermediate metal layer 14 is laminated in a way that the heat insulation layer 13 exposes not more than 0.0001 mm$^2$ per 0.1 mm$^2$. Also, it is preferred that the exposing portion of the heat insulation layer 13 from the intermediate layer 14 is unevenly distributed overall without being biased locally (so called "substantially even").

As above, by forming the exposing portions 13 on the intermediate metal layer 14, even in case a stress is applied to the intermediate metal layer 14 after the thermal spraying, the stress is relieved by the exposing area. Therefore, amotion of intermediate metal layer 14 splayed through thermal spraying on the heat insulation layer 13 from the heat insulation layer 13 is decreased. Also, in the present embodiment, since an area ratio of the exposing portion of the heat insulation layer 13 and a total surface area is 0.5% to 40%, adhesiveness of the heat insulation layer 13 and the surface forming layer 15 is ensured sufficiently.

Meanwhile, "a portion of the insulation layer 13 is exposed" herein strictly means that a part of the heat insulation layer 13 is exposed in a relation between the heat insulation layer 13 and the intermediate metal layer 14 formed on the surface of the insulation layer thereof. In case the heat insulation layer 13 is covered without the surface thereof being exposed as a result of the forming of the surface forming layer 15, it has a different meaning. This is common for the description below.

As the thermal spraying method where the intermediated metal layer 14 is formed on the surface of the heat insulation layer 13, a plasma spraying method can be utilized.

The intermediate metal layer 14 is to enhance the adhesiveness of the heat insulation layer 13 and the surface forming layer 15. The heat insulation layer 13 is made up of a ceramic series material, and since the metallic system material is used in the surface forming layer 15, it is preferred that the intermediate metal layer 14 is made up of a material having a good affinity with the material thereof. Therefore, as the intermediate metal layer, for example, a metallic system material, cermet i.e. a composite material of metal and ceramic, or a gradient material is used. As the cermet, a material based on the material of the heat insulation layer 13 is preferred. As the gradient material, a material where a composition ratio is changed from the base member of the heat insulation layer 13 to the base member of the surface forming layer 15 in accordance with a thickness of the stacked layers is preferred.

Also, for the intermediated metal layer 14, a NiAl alloy can be replaced with the cermet. In this case, the cermet is formed on the surface of the heat insulation layer 13 as the intermediate metal layer 14 by thermal spraying. It is effective particularly for large parts which the linier expansion coefficient heavily affects. As the cermet to be used, a material based on the material of the heat insulation layer 13 is preferred. For example, $ZrO_2$.8MgO.35NiCr, $ZrO_2$.8$Y_2O_3$.25NiCr of zirconia nickel series or $Al_2O_3$.30($Ni_2OA1$) almina nickel series can be used.

Also, for the intermediate metal layer 14, NiAL alloy can be replaced with the gradient material. It is preferred that a ratio is changed from the base member of the heat insulation layer 13 to the material of the surface forming layer 15. As a forming method, for example, preparing several kinds of blends of the powder for thermal splaying having different composite ratio in advance, the blends having different composition rations are supplied sequentially at each step of layer thickness to build a layer stack. Or a two channel powder supplying device supplies the material respectively and a supply ratio can be gradually changed. For example, by gradually changing the composition rate from Zr—Mg oxide to NiAl alloy, the intermediate metal layer 14 using the gradient material can be formed.

The surface forming layer 15 is formed by electroless Ni—P plating. As the above, since the intermediate metal layer 14 does not cover the heat insulation layer 13 completely, this electroless nickel plating treatment is performed for the intermediate layer 14 and the base member 11 directly. It is also performed for the portion of the heat insulation layer 13 exposing form the intermediate layer 14. Being different from the heat insulation layer 13 made up of the ceramic series material, the materials of the surface forming layer 15 are all conductive, therefore plating processes having the same preparation conditions are possible, thus a quality of plating is improved and adhesiveness of plating is enhanced. As the surface forming layer 15, materials having the thermal conductivity of 4.0 to 7.2 W/mk and a thermal expansion coefficient of 11 to 12×10$^{-6}$/° C. are used.

Further, surface machining is carried out on the surface forming layer 15 formed in the above manner in accordance with the optical element to be produced so as to complete the optical element forming metal mold. For example, by cutting work with a diamond tool, a surface forming layer 15 having a V-shaped groove is formed. Also, the objective shape can be formed by etching.

The surface forming layer 15 is preferred to be made up of metallic system material. While nonferrous metal series such as nickel is particularly preferred, it can be formed with a metal nitride, metal carbide or metal nitride carbide. Since the base member 11 and the surface forming layer 15 are metallic series material each other, they can be adhered preferably and there is no possibility to be separated even if a heating history is applied.

Next, an optical element forming metal mold 10 formed by an manufacturing method of an optical element forming metal mold related to the present embodiment will be described.

As FIG. 2 shows, the optical element forming metal mold is formed by stacking the base member 11, bonding layer 12, heat insulation layer 13, intermediate metal layer 14 and surface forming layer 15 beginning at a bottom column in the figure. Also, a holding groove 11a for maintenance is formed. Further, The bonding layer 12 is undercoated between the base member 11 and the heat insulation layer 13 to enhance the adhesiveness. A portion of the surface forming layer 15 goes into inside the groove 11a of the base member 11 as well.

Figure 4:
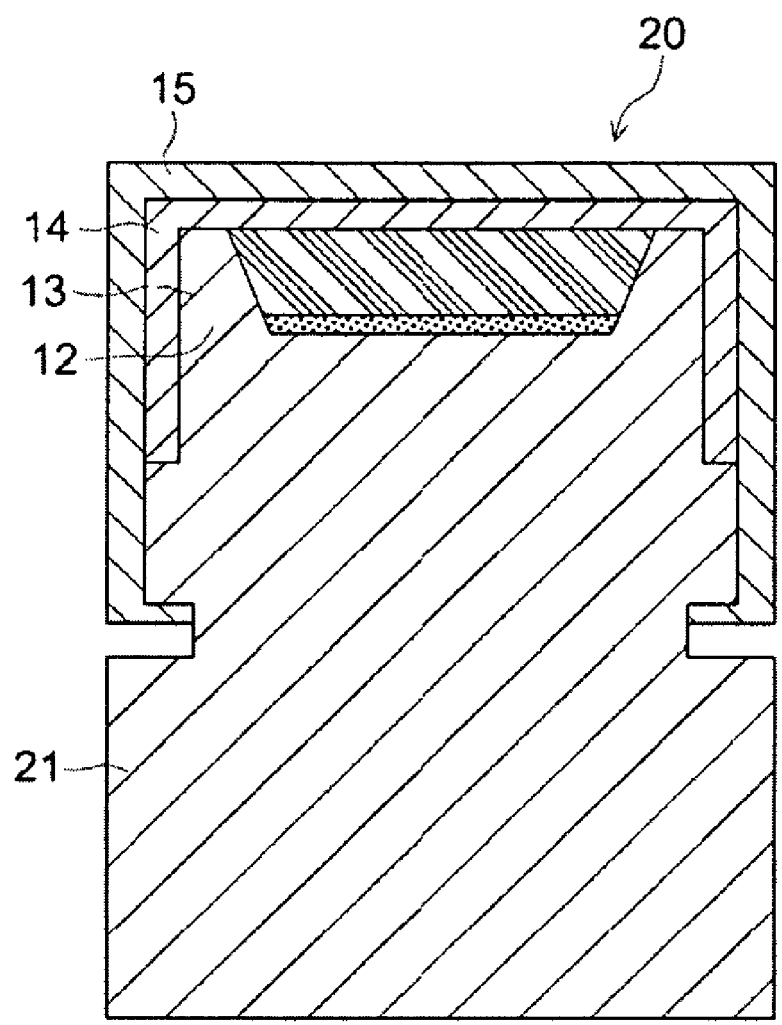
FIG. 4 is a cross-sectional view showing an outline of a cavity metal mold having a base member in a shape of a ship bottom.

Also, for a product which does not requires molding transferability to an outermost of a periphery of the surface forming layer 15, the optical element forming metal mold having the base member in a shape of the ship bottom shown in FIG. 4 can be used. In this way, the adhesiveness between the base member 11 and heat insulation layer 13 is enhanced. Also, at the periphery, the side surface of the base member 11 is not necessary to be covered.

Embodiment

Figure 6:
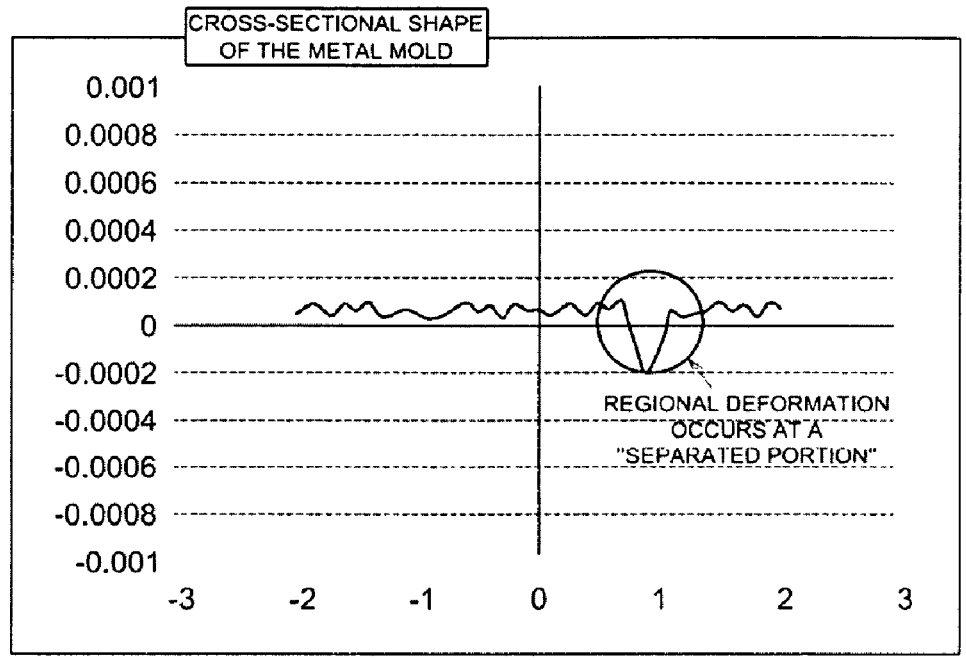
FIG. 6(A) shows a shape of a cross section of a surface forming layer after surface forming under a forming pressure in a comparison example 1.
FIG. 6(B) shows a shape of a cross section of surface forming layer after surface forming under a forming pressure in an embodiment 1.
Figure 6:
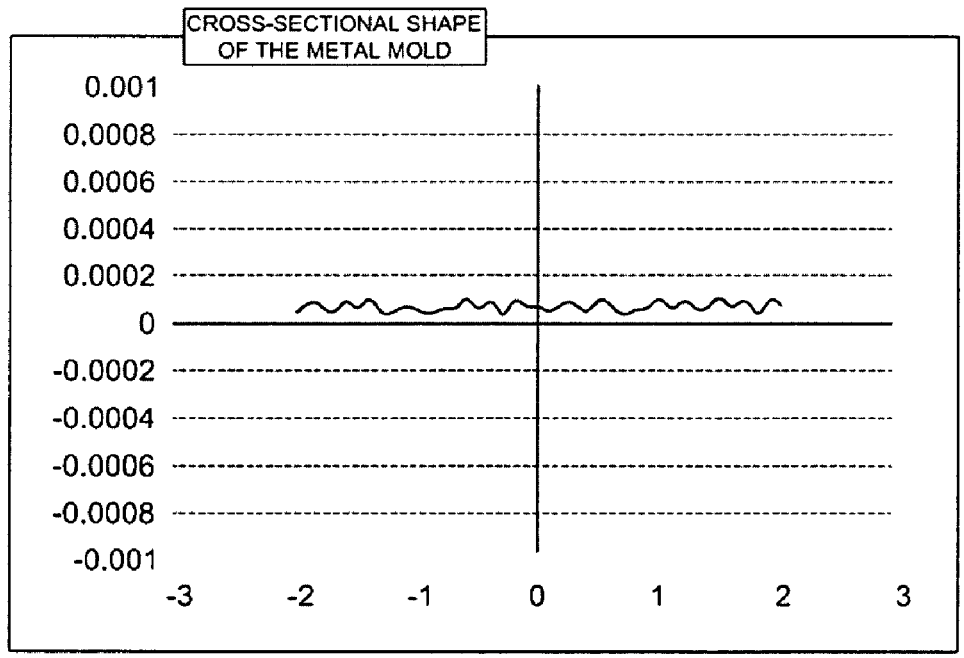

In the following description, an embodiment of a layer stack of the intermediate metal layer 14 in a manufacturing method of the optical element forming metal mold related to the present invention will be described with reference to FIG. 5 and FIG. 6. In the following verification, exposure of the heat insulation layer 13 in respect to the intermediate metal layer 14 is evaluated using an optical microscope (KEYENCE corporation VH-Z450). FIG. 5 shows conditions of thermal spraying in a comparative example 1 and a comparative example 2, evaluation of exposure thereof and evaluation of each layer of the optical element forming metal mold formed under the conditions thereof. FIG. 6(A) shows a cross-sectional shape of the surface forming layer 15 after surface treatment under a forming pressure in the comparative example 1 and FIG. 6(B) shows a cross-sectional shape of the surface forming layer 15 after surface treatment under a forming pressure in the embodiment 1. In a graph in FIG. 6, a horizontal axis indicates a position of each layer in a surface direction in the cross-section of the metal mold and a vertical axis indicates a position of the surface forming layer 15 in a direction perpendicular to the surface direction in the metal mold cross-section.

Embodiment 1

As FIG. 5 shows, thermal spraying of the intermediate metal layer 14 onto the surface of the heat insulation layer 13 was carried out under the thermal spraying conditions of a powder amount of 6 g/min and a spraying time of 0.1 sec. Now the powder amount of 6 g/min is a value within a preferable range of powder amount of 3 to 10 g/min and the splaying time of 0.1 sec is a value within a preferable range of spraying time of 0.01 to 1 sec.

In the above case, exposure of the heat insulation layer 13 of 0.0001 to 0.01 mm² per 0.1 mm² in 80% of a total surface area of the intermediate metal layer 14 is ensured.

In the optical element forming metal mold 10 formed through thermal spraying of the intermediate metal layer 14 in the above manner, amotion (hereinafter called "unseating") of the intermediated layer 14 from the heat insulation layer 13 does not occur and a local deformation on the metal mold does not occur under the forming pressure. Therefore, as FIG. 6(B) shows, the surface of the surface forming layer 15 maintains a substantially constant position at a height in a direction perpendicular to the surface under the forming pressure. Also, since the intermediate metal layer 14 is sufficiently laminated on the heat insulation layer, the satisfactory adhesiveness between the heat insulation layer 13 and the surface forming layer 15 is realized.

COMPARATIVE EXAMPLE 1

As FIG. 5 shows, thermal spraying of the intermediate metal layer 14 onto the surface of the heat insulation layer 13 was carried out under the thermal spraying conditions of a powder amount of 12 g/min and a spraying time of 1 sec. Now the powder amount of 12 g/min is a value outside the preferable range of powder amount of 3 to 10 g/min and the splaying time of 1 sec is a value within the preferable range of spraying time of 0.01 to 1 sec.

In this case exposure of the heat insulation layer 13 was not observed across the whole surface area of the intermediate metal layer 14. Because of a large amount of the powder, the intermediate metal layer 14 is splayed evenly on the entire surface of the heat insulation layer 13 and as a result, the heat insulation layer 13 is completely covered.

In the optical element forming metal mold 10 formed through thermal spaying of the intermediate layer 14 in the above manner, in case stress is applied to the intermediate metal layer 14, the stress is not relieved, since the exposing part does not exist, then on a surface between the intermediate metal layer 14 and the heat insulation layer 13, "unseating" occurs locally at a height in the direction perpendicular to the surface and as FIG. 6(A) shows, local deformation of the optical element forming metal mold occurs under the forming pressure.

As above, in the thermal spraying where the amount of the powder is departing from the aforesaid preferable range and spraying time is within the preferable range, the intermediate metal layer 14 and the heat insulation layer 13 separate each other. Therefore, it is difficult to form a highly accurate optical element by such an optical element forming metal mold 10.

COMPARATIVE EXAMPLE 2

As FIG. 5 shows, thermal spraying of the intermediate metal layer 14 onto the surface of the heat insulation layer 13 was carried out under the thermal spraying conditions of a powder amount of 2.5 g/min and a spraying time of 0.8 sec. Now, the powder amount of 2.5 g/min is a value outside the preferable range of powder amount of 3 to 10 g/min and the splaying time of 0.8 sec is a value within the preferable range of spraying time of 0.01 to 1 sec.

In this case, 50% of exposure of the intermediate metal layer 14 in respect to the entire surface area of the heat insulation layer 13 occurs unevenly. It cannot be identified as a substantially even exposure in a preferable state, and the exposure beyond a preferable exposing range of 0.5 to 40% in respect to the entire area of the surface of the heat insulation layer 13 occurs. Thus, since the amount of the powder is small, the intermediate metal layer 14 is not splayed evenly on the entire surface of the heat insulation layer 13, a large portion of the heat insulation layer 13 exposes, and the intermediate metal layer 14 is not laminated sufficiently.

Then, in the optical element forming metal mold 10 formed by thermal spraying of the intermediate metal layer 14, there is created a portion where the intermediate metal layer 14 to enhance the adhesiveness between the surface forming layer 15 and the heat insulation layer 13 is not developed sufficiently thereby, defects such as pin holes occur on the surface forming layer 15, and as a result, a desirable optical surface cannot be formed on the optical element after surface treatment.

As above, in the thermal spraying within the preferable spraying time and with a small amount of the powder deviating form the aforesaid preferable range, there is occurred the portions where the intermediate metal layer 14 is not developed sufficiently thus it is difficult to form the optical element forming metal mold 10.

In the present embodiments, while the metal mold 10 of core type has been described, the configuration thereof can be adaptable for metal mold 2 and metal mold 4 of cavity mold. Also, it is adaptable for all metal molds including the metal mold 10 of the core mold and metal mold 2 and metal mold 4 of cavity mold.

In accordance with the above embodiments, thanks to the exposing portions on the surface of the intermediate layer, the stress in the production process can be relieved. Thus, there is realized the optical element forming metal mold where the amotion of the intermediate layer formed on the heat insulation layer from the heat insulation layer is suppressed. Therefore, in the aforesaid optical element forming metal molds, deformation of the optical element forming metal molds caused by forming pressure for forming of the optical element is suppressed and a optical performance of the optical element formed the optical element forming metal mold thereof can be ensured preferably.

What is claimed is:

1. An optical element forming metal mold, comprising:
   a core mold;
   a cavity mold arranged with a forming space between the core mold;

wherein at least one of the core mold or the cavity mold comprises:
a base member,
a heat insulation layer formed on a surface of the base member,
an intermediated metal layer, formed through thermal spraying on an opposite side surface of the heat insulation layer to the base member, through which the heat insulation layer is exposed, and
a surface forming layer where a surface shape to be transferred onto the optical element is formed on a surface opposite to the heat insulation layer side of the intermediate metal layer,
wherein the intermediate metal layer is formed in a way that the heat insulation layer is exposed substantially evenly through an entire surface of the intermediate metal layer.

2. An optical element forming metal mold, comprising:
a core mold; and
a cavity mold arranged with a forming space between the core mold;
wherein at least one of the core mold or the cavity mold comprises:
a base member,
a heat insulation layer formed on a surface of the base member,
an intermediated metal layer, formed through thermal spraying on an opposite side surface of the heat insulation layer opposite to the base member, through which the heat insulation layer is exposed, and
a surface forming layer where a surface shape to be transferred onto the optical element is formed on a surface opposite to the heat insulation layer side of the intermediate metal layer,
wherein the intermediate metal layer is formed in a way that 0.5 to 40% of a total surface area of the heat insulation layer is exposed evenly through an entire surface of the intermediate metal layer.

3. The optical element forming metal mold of claim 1, wherein a surface area of a surface of the intermediate metal layer on which the surface forming layer is laminated is 50 $cm^2$ or less, exposure of the heat insulation layer is 0.0001 to 0.01 $mm^2$ per 0.1 $mm^2$ in 10% or more of the total area of the surface of the intermediated layer, and 0.0001 $mm^2$ or less per 0.1 $mm^2$ in the rest of the total area thereof.

* * * * *